United States Patent [19]

Holmberg

[11] Patent Number: 4,618,520

[45] Date of Patent: * Oct. 21, 1986

[54] PREFABRICATED BINDABLE SHEET

[75] Inventor: Albert E. Holmberg, Edina, Minn.

[73] Assignee: The Holmberg Company, Minneapolis, Minn.

[*] Notice: The portion of the term of this patent subsequent to May 8, 2001 has been disclaimed.

[21] Appl. No.: 584,169

[22] Filed: Feb. 27, 1984

[51] Int. Cl.⁴ ............................................... B32B 3/10
[52] U.S. Cl. ....................................... 428/131; 281/2; 282/11.5 A; 412/900; 428/137; 428/156; 428/173; 428/194; 428/537.5
[58] Field of Search ................... 282/11.5 A; 412/900; 428/173, 194, 131, 137, 156, 537.5; 281/2

[56] References Cited

U.S. PATENT DOCUMENTS 2,649,386  8/1953  Snowman ............................ 428/172
4,447,481  5/1984  Holmberg et al. ..................... 428/40

FOREIGN PATENT DOCUMENTS 1010472  5/1977  Canada .

Primary Examiner—George F. Lesmes
Assistant Examiner—P. R. Schwartz
Attorney, Agent, or Firm—John W. Adams

[57] ABSTRACT

A bindable sheet which includes a recessed marginal edge portion in which a heat-responsive glue is applied, said recessed portion including a plurality of spaced-apart openings therethrough to expose the glue on the opposite side of the sheet from the recess, the thickness of the glue being no greater than the depth of the indentation of the sheet to produce a substantially uniform sheet thickness throughout its entire surface area. The method of binding a plurality of sheets together which includes the steps of indenting the marginal edge of a sheet, applying a ribbon of heat-responsive glue in the indented portion, the thickness of which does not exceed the depth of the indentation recess positioning two sheets together with the glue edges in registration and applying heat and pressure to the glue edges to seal the same together without increasing the thickness of the bound-together sheets.

1 Claim, 6 Drawing Figures

PREFABRICATED BINDABLE SHEET

BACKGROUND OF THE INVENTION

In the past, sheets with glue pre-applied thereto such as disclosed in my co-pending U.S. patent application Ser. No. 06/453,814, filed Dec. 27, 1982, have been used successfully; however, these increased the thickness of the bound-together glued portion and occasionally the binding of adjacent sheets has not been as effective as may be desired. The present invention is intended to cure both of these problems by providing an indented recess portion with heat-responsive glue applied therein and providing openings through the indented portion to expose the glue on the opposite side of the sheet from the indentation to permit glue-to-glue binding when pressurized heat is applied to the sheets to be bound.

SUMMARY OF THE INVENTION

The invention includes a bindable sheet having a heat-responsive ribbon of glue received within an indented marginal portion to maintain substantially uniform sheet thickness and the provision of a plurality of openings in the indented portion to expose a glue portion on the opposite side of the sheet to permit glue-to-glue adherence when binding heat and pressure are applied thereto.

DETAILED DESCRIPTION OF THE INVENTION

Figure 1:
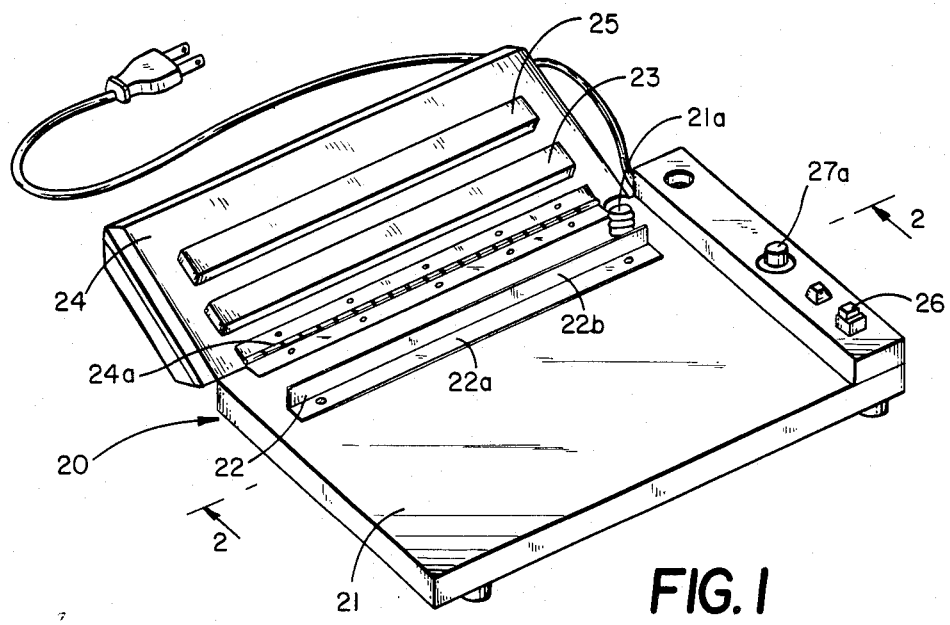
FIG. 1 is a perspective view of a binding devise.
Figure 2:
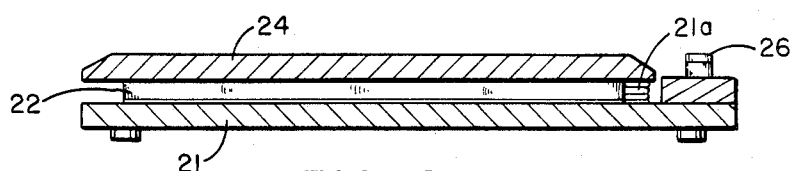
FIG. 2 is a sectional view thereof, in closed position taken on the line 2—2 of FIG. 1.
Figure 3:
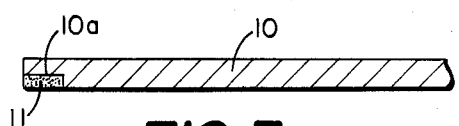
FIG. 3 is a sectional view of a sheet embodying one form of the invention.
Figure 4:
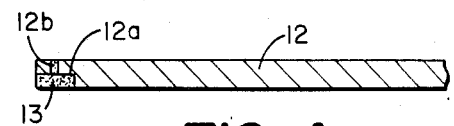
FIG. 4 is a sectional view of a sheet embodying another form of the invention.
Figure 6:
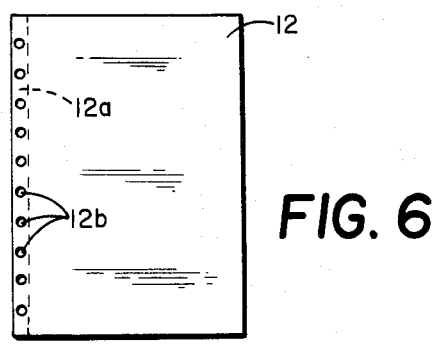
FIG. 6 is a top plan view of a sheet embodying the invention disclosed in FIG. 4.

Two forms of the invention are illustrated. FIG. 3 shows a sheet of paper 10 having a marginal indentation or recess 10a in which a ribbon of glue 11 is received. The depth of the recess 10a and the thickness of the glue ribbon 11 are substantially equal so that the thickness of the sheet 10 is substantially uniform throughout its entire surface area. It is contemplated that any suitable heat-responsive glue such as a hot melt adhesive marketed by National Starch and Chemical Corporation of Bridgewater, N.J. under their trademark INSTANT LOK can be used satisfactorily. FIG. 4 illustrates an alternative form of the invention wherein the sheet 12 is provided with a marginal indentation or recess 12a having openings 12b formed therein. Adhesive 13 similar to the adhesive 11 is also illustrated and when applied, flows through the openings 12b to be exposed on the opposite side of the sheet 12 from the recess or indentation 13. The openings 12b are also illustrated in FIG. 6.

Figure 5:
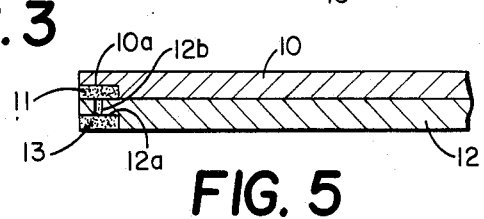
FIG. 5 is a sectional view of a plurality of bound-together sheets embodying both forms of the invention.

FIG. 5 illustrates a sheet 10 having the glue 11 in the recess 10a attached to a sheet 12 having the glue 13 applied in the recess 12a and extending through the openings 12b into contact with the adhesive 11 of the sheet 10. A binding device is illustrated which is similar to that disclosed in my co-pending application Ser. No. 453,814 filed Dec. 27, 1982 entitled Prefabricated Bindable Sheet and Binding Method and Apparatus and is designated as an entirety by the numeral 20 and has a bottom pressure plate 21 with a top pressure plate 24 connected to the bottom plate by a hinge 24a. A spring 21a normally holds the top pressure plate in raised position above the bottom plate 21 and a bottom heater bar 22 in the form of an angle iron having a horizontal portion 22a and a vertical portion 22b is attached to the bottom pressure plate 21. A top heater bar 23 is mounted on the top pressure plate 24 in registration with the bottom heater bar 22 when the top plate 24 is closed. Both bars 22 and 23 may be coated with a non-stick surface such as Teflon to prevent glue from adhering thereto. A top clamping bar 25 is also mounted on the top pressure plate 24 on the opposite side of the heater bar 23 from the hinge 24a to securely clamp the assembled sheets down against the top surface of the bottom pressure plate 21 during the binding operation. An on-off switch 26 is provided for energizing the heater bars 22 and 23 and may be thermostatically controlled by a variable thermostat (not shown) of conventional design, and having a temperature control knob 27a.

The heater bars 22 and 23 heat the adjacent glue edges to bind the same together as in applicant's prior invention. The recess indentations maintain uniform sheet thickness not only prior to binding when the sheets are being printed or otherwise being processed, but also after the sheets have been bound together as described.

It will be seen that this invention provides a heat-sealable bindable sheet in which the heat-responsive adhesive is not only received in a recess of substantially the same depth as the thickness of the adhesive ribbon therein, but also is provided with a series of adhesive transfer passages from one side of the sheet to the other to permit adhesive-to-adhesive bindable adherence between adjacent sheets as illustrated in FIG. 5.

It is to be understood that while there has been illustrated and described certain forms of the present invention, the invention is not to be limited to the specific form or arrangement of parts herein described and shown except to the extent that such limitations are found in the claims.

What is claimed is:
1. A prefabricated bindable sheet comprising,
 a sheet of paper having a marginal recess formed along one edge thereof,
 a substantially continuous strip of heat-responsive glue applied to said paper in said recess of a thickness no greater than the depth of the recess to produce a prefabricated bindable sheet of substantially uniform thickness throughout its entire surface area,
 and a plurality of spaced-apart openings formed in the recessed portion of said sheet and extending therethrough so that the heat-responsive glue applied in said recess extends through the thickness of the sheet and is exposed on the opposite side of the sheet from the recess to produce glue-to-glue binding when two sheets are heat-sealed together.

* * * * *